United States Patent [19]

Benhamou

[11] Patent Number: 4,861,998

[45] Date of Patent: Aug. 29, 1989

[54] RAPID FIRE-DETECTION DEVICE FOR ARMORED VEHICLES

[75] Inventor: André Benhamou, Beauzelle, France

[73] Assignee: Thomson-CSF, Paris, France

[21] Appl. No.: 1,215

[22] Filed: Jan. 7, 1987

[30] Foreign Application Priority Data

Jan. 10, 1986 [FR] France ................................ 86 00319

[51] Int. Cl.[4] ................................................ G01J 1/00

[52] U.S. Cl. ...................................... 250/339; 250/342

[58] Field of Search .................. 250/338 PY, 339, 342

[56] References Cited

U.S. PATENT DOCUMENTS

| | | | |
|---|---|---|---|
| 3,707,695 | 12/1972 | Yamaka | 338/18 |
| 3,742,474 | 6/1973 | Muller | 340/228.2 |
| 4,280,058 | 7/1981 | Tar | 250/339 X |
| 4,384,207 | 5/1983 | Doctor | 250/349 |
| 4,415,806 | 11/1983 | Tar | 250/339 |
| 4,463,260 | 7/1984 | Ikeda | 250/339 |
| 4,694,172 | 9/1987 | Powell et al. | 250/342 X |

FOREIGN PATENT DOCUMENTS

| | | |
|---|---|---|
| 0078442 | 5/1983 | European Pat. Off. . |
| 2118754 | 11/1983 | United Kingdom . |
| 2119985 | 11/1983 | United Kingdom . |
| 2142757 | 1/1985 | United Kingdom . |

OTHER PUBLICATIONS

Optics Communications, vol. 40, No. 5, Feb. 1982, pp. 361-363, North Holland, Amsterdam, NL; M. M. Pradhan et al.: "Remote Sensing of Temperature by a TGS Pyroelectric Detector".

*Primary Examiner*—Gene Wan
*Attorney, Agent, or Firm*—Oblon, Spivak, McClelland, Maier & Neustadt

[57] ABSTRACT

A device for the rapid detection of hydrocarbon fire inside an armored vehicle. Infrared radiation resulting from the appearance of the fire is detected using lithium tantalate as a pyroelectric sensor for producing a voltage signal. A voltage pulse is produced at the beginning of the infrared radiation. Alternatively, the current signal of the pyroelectric sensor may be used and subsequently integrated. Fire is detected by the presence of both infrared and ultraviolet radiation.

8 Claims, 2 Drawing Sheets

FIG_1
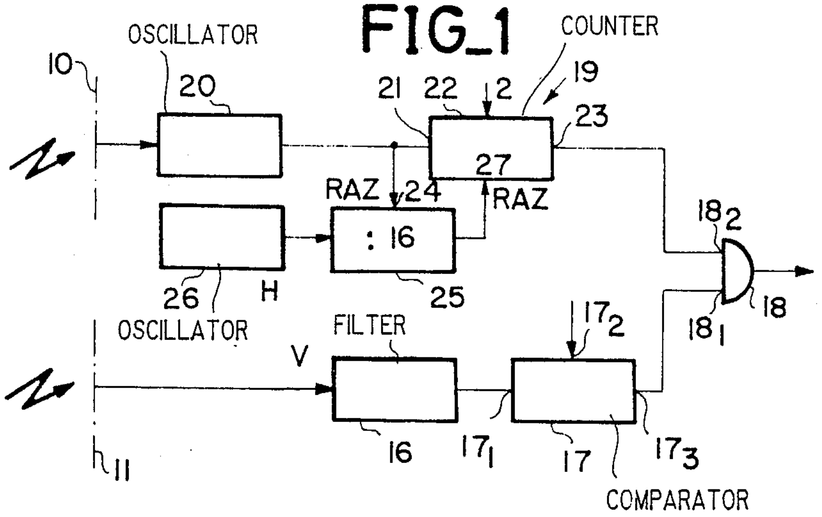
FIG_2
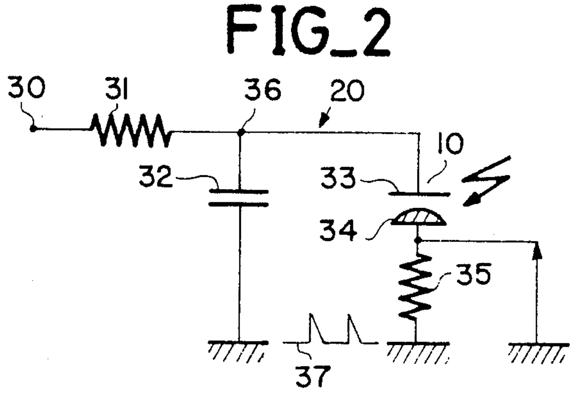
FIG_3-a
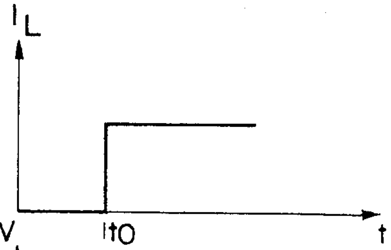
FIG_3-b
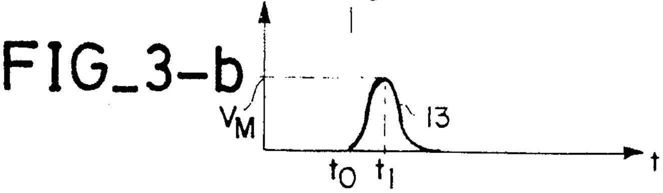

RAPID FIRE-DETECTION DEVICE FOR ARMORED VEHICLES

BACKGROUND OF THE INVENTION

The invention pertains to a device for the rapid detection of flames, notably a hydrocarbon fire, particularly in an armored vehicle.

In a combat vehicle, the fuel tank is generally found inside the armoured car which constitutes this vehicle; it lines a large part of the walls of this vehicle.

The weapons with which these vehicles are attacked are explosive missiles with hollow charges which concentrate the heat energy at one point and act like welding torches to pierce the armour. The missiles also go through the fuel tank; as a result, the fuel vaporizes in the cockpit and quickly catches fire in an explosive manner. Protecting the personnel inside the armoured vehicle thus requires the automatic and rapid detection of a flame or an explosive in order to actuate, again automatically and rapidly, an extinguisher in the cockpit To clarify the picture, it can be pointed out here that it is estimated that, as a rule, not more than 150 milliseconds must elapse between the start of a fire and its extinction if the personnel are not to suffer first-degree burns.

STATE OF THE PRIOR ART

To prevent false alarms, the detecting device must be particularly selective, i.e. there should be no danger of triggering off the extinguisher when there is no fire. Generally, it is the electromagnetic radiation emitting properties of the hydrocarbon combustion flames that are used for this selective detection. The spectrum of these flames extends from the ultra-violet (UV) to the infra-red (IR). In the ultra-violet part of the spectrum, it is usually solar radiation which can be mistaken for a hydrocarbon fire. But the shortest wavelength of ultraviolet solar radiation is 0.25 microns while the hydrocarbon flames emit radiation below this wavelength. Consequently, an UV radiation detector sensitive to wavelengths smaller than 0.25 microns is normally used.

Furthermore, an infra-red radiation detector is used to ascertain that it is really heating radiation that is involved.

SUMMARY OF THE INVENTION

The invention provides a detecting device of the above-mentioned type which is of simple construction while, at the same time, reducing the risk of false alarms.

The invention, a rapid detecting device which operates within a period of less than 100 ms, comprises a pyroelectric sensor, and the output signal used for the detection is a voltage response of this sensor.

A pyroelectric sensor comprises a crystal, of lithium tantalate for example, one surface of which receives the radiation to be detected. The application of the radiation causes a heating process and the production of a capacitor charge. The use of a pyroelectric device of this type or the detection of fires has been known in the prior art, but such a sensor has not been used until now for very rapid detection because it is considered to have a slow response. However, the inventor has observed that, by using the voltage signal of a pyroelectric sensor of this type, a signal of very good quality is obtained within a few milliseconds. This property can be explained by the fact that the pyroelectric sensor accumulates the heat energy received and, consequently, behaves like an integrator (in the mathematical sense of the word), thus making it possible to obtain an excellent signal/noise ratio and reducing the risk of false alarms.

Besides, in a steady state, a slow variation in the ambient temperature or the slow variation of the amplitude of the irradiation does not cause any signals, a fact that further contributes to diminishing the risk of false alarms. Furthermore, both at the start of the detection and in a steady state, the signal obtained is very barely vitiated by noise.

Finally, the circuit associated with a pyroelectric sensor of this type is an extremely simple one.

To reduce the risk of false alarms resulting from very short-duration stray signals, it is advantageous to plan for a low-pass filter after the pyroelectric sensor, the high-end cut-off frequency of which is about 5 KHz.

Before the pyroelectric sensor, based for example on lithium tantalate, a filter is set, letting through only wavelengths which preferably range from 4 to 4.5 microns. Thus, the discriminative power of the detecting device is further increased for, in this zone of wavelengths, there is further elimination of the stray signal sources formed by heat sources in standard glass bulbs: lighting bulbs, photographic flash bulbs etc.

DETAILED DESCRIPTION OF THE DRAWINGS

Other characteristics and advantages of the invention will appear in the description of some of its modes of embodiment, this description being made with reference to the herewith-appended drawings of which:

FIG. 1 is a diagram of a detection device according to the invention,

FIG. 2 is a diagram of an embodiment of a part of the device of FIG. 1, and FIGS. 3*a* and 3*b* are graphs relating to the operation of the device of FIG. 1.

DESCRIPTION OF THE PREFERRED EMBODIMENT

Figure 4:
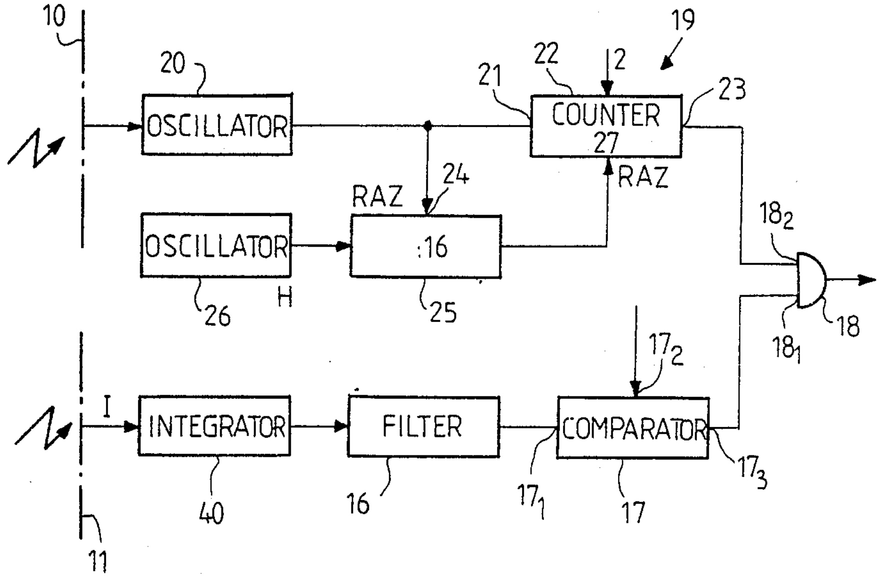
FIG. 4 is a diagram of a detection device according to a second embodiment of the invention.

The fire-detecting device, which shall now be described with reference to the figures, comprises, in a way which is known per se , an ultra-violet radiation detector 10 which is sensitive to wavelengths ranging from 0.18 to 0.25 microns and which is thus sensitive to the radiation emitted by the hydrocarbon flames but insensitive to solar radiation (the spectrum of which only starts at about 0.25 microns).

According to the invention, there is also provision for an infra-red radiation pyroelectric sensor 11. In a steady state, this sensor 11 delivers no signal when the infra-red radiation received by it has a constant amplitude. However, upon the appearance of a flame, i.e. in a transient state, an irradiation of a constant amplititude makes it possible to obtain a signal on condition that this signal is the voltage at the terminals of the capacitor formed by the pyroelectric crystal; the latter property results from the following considerations:

An energy dE, applied to one surface of the pyroelectric crystal, causes a charge dq of the capacitor of capacitance C formed by the crystal. We can thus write:

$$dq = KdE = CdV \quad (1)$$

In the above formula, V is the voltage at the terminals of the capacitor and K is a constant. From this formula, we deduce:

$$dV = \frac{K}{C}\, dE, \quad (2)$$

whence $$\frac{dV}{dt} = \frac{K}{C} P \quad (3)$$

In this formula, P is the power of the irradiation. Thus:

$$dV = \frac{K}{C} Pdt, \quad (4)$$

giving:

$$V_2 - V_1 = \frac{K}{C} \int_{t_1}^{t_2} Pdt \quad (5)$$

Thus, before reaching thermal equilibrium with the ambient environment, the pyroelectric crystal accumulates energy and the voltage at its terminals is the integral or primitive of the irradiation power. This integrating of the voltage signal can be used to obtain an especially favorable signal/noise ratio. When the pyroelectric crystal has reached thermal equilibrium, the behaviour (under voltage) of the pyroelectric crystal is no longer integrative but derivative for, then, its temperature varies only if the power of the irradiation varies.

The operation of this sensor 11 is illustrated by the graphs in FIGS. 3*a* and 3*b*.

FIG. 3*a* depicts the amplitude variations $I_L$ as a function of the time t of an infra-red radiation with a constant wavelength. This radiation appears suddenly at the time $t_0$. The voltage response of the pyroelectric sensor 11 is depicted by the curve 13 of the FIG. 3*b*. The time which elapses between the instant $t_0$ and the instant $t_1$, with a maximum response $V_M$, is relatively small. It lasts a few milliseconds, about a hundred milliseconds at the most.

Another advantage of a pyroelectric sensor which, in a steady state, directly gives a rate-of-variation signal is that it does not require the use of a differentiating circuit. The embodiment of the detecting device is thus simplified, making the device more dependable.

In front of the lithium tantalate pyroelectric detector, there is a filter which only lets through radiation with wavelengths ranging from about 4 to 4.5 microns, thus further increasing the discriminative power. For, at these wavelengths, the solar radiation is weakened through the presence of carbon dioxide $CO_2$ in the atmosphere and the light sources contained in a sheath of standard glass do not emit an infra-red light at these wavelengths since the standard glass stops the radiation from about 2.7 microns onwards.

The signal V of the pyroelectric sensor 11 is applied to the input of a low-pass filter 16, the high-end cut-off frequency of which is about 5 KHz. Thus, the false alarms which would result from short-duration stray signals are eliminated.

The output of the filter 16 is applied to the first input $17_1$ of a comparator 17, the second input $17_2$ of which receives a signal which represents a pre-determined threshold. This comparator 17 delivers a signal to its output $17_3$ when the signals $17_1$ and $17_2$ are equal or when the signal at the input $17_1$ is greater than the signal at the input $17_2$. The output $17_3$ is connected to the first input 181 of an AND gate, the second input 182 of which receives a signal from a channel 19 for processing the signal given by the ultra-violet (UV) radiation detector 10.

This channel 19 comprises a relaxation oscillator circuit 20 which will be described in greater detail with reference to FIG. 2. This circuit 20 gives pulses about every 2 ms when UV radiation is detected. These pulses are delivered to the counting input 21 of a counter 22 mounted as a comparator to transmit a signal to its output 23 which is linked to the input $18_2$ of the gate 18 when the number 2 has been reached.

The output pulses of the circuit 20 are also applied to the zeroizing input 24 of a divider by sixteen 25, the input of which receives a clock signal supplied by an oscillator 26 with a period of 1.25 milliseconds. The output of the divider 25 is connected to the zeroizing input 27 of the counter 22.

If a second pulse appears at the input 21 of the counter 22 within the 20 milliseconds that follow the transmission of a first pulse by the relaxation oscillator circuit 20, a second pulse appears at the input 21 of the counter 22, the output 23 applies a signal to the input $18_2$ of the AND gate 18. If, on the contrary, a second pulse does not appear within these 20 milliseconds at the output of the relaxation oscillator circuit 20, the divider 25 is not zeroized within this span of time and, consequently, a zeroizing pulse is applied to the input 27 of the counter 22, the content of which cannot reach the number 2. Thus, there is no fire-detection signal at the input $18_2$.

The relaxation oscillator circuit 20 (FIG. 2) is powered by a voltage source which applies a potential of 500 volts to a terminal 30 of a resistor with a high value, for example 15 megohms (MΩ), the other terminal of which is connected, on the one hand, to the ground by means of a capacitor 32, and, on the other hand, to the first electrode 33 of the detector 10, the other electrode 34 of which is linked to the ground by means of a measuring resistor 35.

This circuit works as follows: when the sensor 10 receives no ultra-violet rays of a wavelength ranging from 0.18 to 0.25 microns, this sensor constitutes an open circuit, the terminal 36 of the resistor 31 opposite to the terminal 30 remains at a potential of 500 volts and the difference in potential at the terminals of the resistor 35 is nil. When ultra-violet radiation appears, an ionization process occurs within the detecting tube 10, making the space 33, 34 conductive. In these circumstances, the capacitor 32 is discharged in the resistor 35 and a pulse therefore appears at the terminals the terminals of this resistor 35. When the potential of the point 36 falls below the value of 350 volts, the ionization in the tube 10 cannot be maintained despite the presence of ultra-violet radiation, and this detector then constitutes an open circuit; consequently, the capacitor 32 is recharged, thus providing for a fresh pulse if the UV radiation remains.

As an alternative, instead of the voltage signal of the pyroelectric sensor, its current signal I may be used as shown in FIG. 4. But, in this case, an integrator 40 is used to integrate this current signal. Since the intensity of the current used by the capacitor is proportionate, at the start of the detection, to the power P of the irradiation, this power P is thus integrated.

What is claimed is:

1. Device for the rapid detection, within a period of no more than about 100 ms of hydrocarbon fire inside an armored vehicle, comprising a detector having a pyroelectric sensor for sensing infra-red radiation from a hydrocarbon flame, said sensor accumulating heat energy to produce an output voltage signal within 100 ms indicative of the presence of a hydrocarbon flame; and a means for responding to said output voltage signal.

2. Device according to claim 1 further comprising a low-pass filter connected to receive said output voltage signal, the high-end cut-off frequency of which is in the range of 5 KHz and produces an output connected to said means for responding.

3. Device according to claim 1 or 2 wherein, since the pyroelectric sensor is sensitive to variations in the intensity of radiation in the infra-red spectrum, the detector comprises, before the sensor, a filter which only lets through radiation with a wavelength ranging from about 4 to 4.5 microns.

4. Device according to claim 1, wherein the pyroelectric sensor comprises a crystal made of lithium tantalate.

5. Device according to claim 1, further comprising a second sensor sensitive to the presence of ultra-violet radiation emitted by the hydrocarbon flame and having an output, said means for responding being actuated only when said output and said output voltage signal are received.

6. Device according to claim 5, wherein the second sensor is sensitive to ultra-violet radiation with a wavelength of less than 0.25 microns.

7. Device for the rapid detection, within a period of no more than about 100 ms of hydrocarbon fire inside an armored vehicle further comprising a detector having a pyroelectric sensor for sensing infra-red radiation from a hydrocarbon flame, said sensor accumulating heat energy to produce an output current intensity signal within 100 ms indicative of the presence of a hydrocarbon flame and further comprising an integrator to integrate this output current intensity signal and means for responding to said output current intensity signal.

8. Device according to claim 1 wherein said means for responding is a fire extinguishing system.

* * * * *